(12) United States Patent
Nakazono et al.

(10) Patent No.: US 6,880,131 B1
(45) Date of Patent: Apr. 12, 2005

(54) APPARATUS AND METHOD FOR SELECTING DATA SETS

(75) Inventors: Hiroki Nakazono, Hamamatsu (JP); Shinichi Ito, Hamamatsu (JP)

(73) Assignee: Yamaha Corporation, Hamanatsu (JP)

( * ) Notice: Subject to any disclaimer, the term of this patent is extended or adjusted under 35 U.S.C. 154(b) by 0 days.

(21) Appl. No.: 09/515,905

(22) Filed: Feb. 29, 2000

(30) Foreign Application Priority Data

Mar. 1, 1999 (JP) .......................................... 11-053209

(51) Int. Cl.$^7$ ................................................. G09G 5/00
(52) U.S. Cl. ....................... 715/840; 715/853; 715/864; 715/813; 707/205
(58) Field of Search ................................ 715/813, 853, 715/819, 828; 707/205; 345/864, 866, 810, 817, 818, 819, 825, 840, 841, 184, 169, 168

(56) References Cited

U.S. PATENT DOCUMENTS

| | | | | |
|---|---|---|---|---|
| 5,398,045 A | * | 3/1995 | Sach et al. | 345/172 |
| 5,734,719 A | * | 3/1998 | Tsevdos et al. | 700/234 |
| 5,898,434 A | * | 4/1999 | Small et al. | 345/810 |
| 5,908,997 A | * | 6/1999 | Arnold et al. | 84/478 |
| 5,956,034 A | * | 9/1999 | Sachs et al. | 345/776 |
| 5,963,916 A | * | 10/1999 | Kaplan | 705/26 |
| 6,118,450 A | * | 9/2000 | Proehl et al. | 345/810 |

\* cited by examiner

*Primary Examiner*—Ba Huynh
(74) *Attorney, Agent, or Firm*—Morrison & Foerster LLP

(57) ABSTRACT

A storage medium stores a large number of data sets or files as grouped in a smaller number of data groups or directories, each data group containing a plurality of data sets. On a control panel is provided a display screen, and are also provided a plurality of group call buttons to be individually allocated for the respective data groups and a plurality of data set designating buttons to be individually allocated for the respective data sets. When the user actuates an intended one of the group call buttons, identifying names or marks of the data sets of the called group are listed in a display screen for a further selection of the intended data set from among the listed group by user's actuation of an intended one of the data set designating buttons. This enables an easy and speedy selection of a particular intended data set from among a large number of data sets.

5 Claims, 6 Drawing Sheets

APPARATUS AND METHOD FOR SELECTING DATA SETS

BACKGROUND OF THE INVENTION

1. Field of the Invention

The present invention relates to an apparatus and a method for selecting data sets stored in a storage medium, and more particularly to such an apparatus and a method in which a storage medium stores a large number of data sets or files as grouped in a smaller number of data groups or directories, each data group containing a plurality of data sets, and there are provided a plurality of group call buttons to be individually allocated for the respective data groups, so that when an intended one of the group call buttons is actuated, the data sets of the called group will be listed in a display window or screen for a further selection of the intended data set from among the listed group. This enables an easy and speedy selection of a particular intended data set from among a large number of data sets.

2. Description of the Prior Art

In the computer field, the conventional and prevailing manner of selecting a data set (e.g. a file) from among a number of data sets stored in a storage medium in a hierarchical allotment as grouped in a plurality of directories (folders) is to first designate a directory which is one of the storage areas in the storage medium using a mouse device or a keyboard so that a list of a plurality of identifiers (names or marks) are displayed on a large screen representing a corresponding plurality of data sets contained in the designated directory, i.e. the designated storage area, and then to designate a desired identifier using the mouse or the keyboard, and to click the mouse or hit the enter key, thereby designating the aimed data set. Electronic musical instruments these days are mostly configured with computer systems and are provided with a data set selecting arrangement of the above-mentioned type. But, due to lack of a large display screen and a mouse device, an ordinary electronic musical instrument will require the scrolling of a small size display window to call a desired storage area and then to designate an intended data set.

But in the case of such an apparatus not having a mouse device nor a large size display screen as an above-mentioned conventional electronic musical instrument, there will be an inevitable need of pressing the cursor key many times repetitively in order to scroll the displayed list and select an aimed data set in the allotted storage area, which operation will be very troublesome.

SUMMARY OF THE INVENTION

It is, therefore, a primary object of the present invention to solve the above-mentioned drawbacks involved in such a conventional apparatus of data set selecting type like an electronic musical instrument, by providing a novel type of data selecting apparatus and method which will permit an easy and rapid selection of an aimed data set stored in the allotted storage area from among a large number of data sets stored in the storage medium.

In order to accomplish the object of the present invention, the invention provides a data set selecting apparatus comprising: a storage medium including a plurality of storage areas and storing a plurality of data sets as grouped in a plurality of data groups, each storage area being allotted to each of the data groups and storing a plurality of data sets which belong to the allotted data group; a display screen which displays a list of data sets; a plurality of data group selecting controls, each of which is correspondingly allocated for each of the data groups individually and selects a data group including data sets allotted thereto and stored in the allotted storage area of the storage medium; a display controller which causes the display screen to list a plurality of identifiers, each representing each of the data sets allotted to the selected data group; and a plurality of data set selecting controls, each of which is correspondingly allocated for each of the identifiers being listed on the display screen and selects a data set from among the data sets correspondingly represented by the listed identifiers according to user's selection of one of the listed identifiers. The apparatus is preferably provided with a control panel carrying the display screen, the data group selecting controls and the data set selecting controls.

According to the present invention, therefore, when the user actuates an intended one of the data group selecting controls or group call buttons, identifying names or marks of the data sets of the called group are listed in the display screen for a further selection of the intended data set from among the listed group. This enables the user to directly designate an aimed data group to have a plurality of data sets in the designated data group listed in the display screen, so that the user can easily and visually recognize the listed plurality of data sets and can select from among them an intended one of the data sets easily and rapidly. Further, with such an apparatus employed in an electronic musical instrument, the electronic musical instrument will be very maneuverable and convenient for operation and musical performance with an easy and speedy selection of a particular intended data set from among a large number of data sets.

As will be understood from the above description about the apparatus for selecting data sets, a sequence of steps each performing the operational function of each of the structural elements of the above data set selecting apparatus will constitute an inventive method for selecting data sets according to the spirit of the present invention.

Further as will be understood from the above description about the apparatus and the method for generating additive notes, a storage medium containing a program executable by a computer system, which program comprising program modules for executing a sequence of the processes each performing the operational function of each of the structural element modules of the above data set selecting apparatus or performing each of the steps constituting the above data set selecting method will reside within the spirit of the present invention.

Further as will be apparent from the description herein later, some of the structural element modules of the present invention are configured by a computer system performing the assigned functions according to the associated programs. They may of course be hardware structured discrete devices performing the same functions.

The present invention may take form in various components and arrangement of components including hardware and software, and in various steps and arrangement of steps. The drawings are only for purposes of illustrating a preferred embodiment and processes, and are not to be construed as limiting the invention.

BRIEF DESCRIPTION OF THE DRAWINGS

For a better understanding of the present invention, and to show how the same may be practiced and will work, reference will now be made, by way of example, to the accompanying drawings, in which.

DESCRIPTION OF THE PREFERRED EMBODIMENTS

Figure 1:
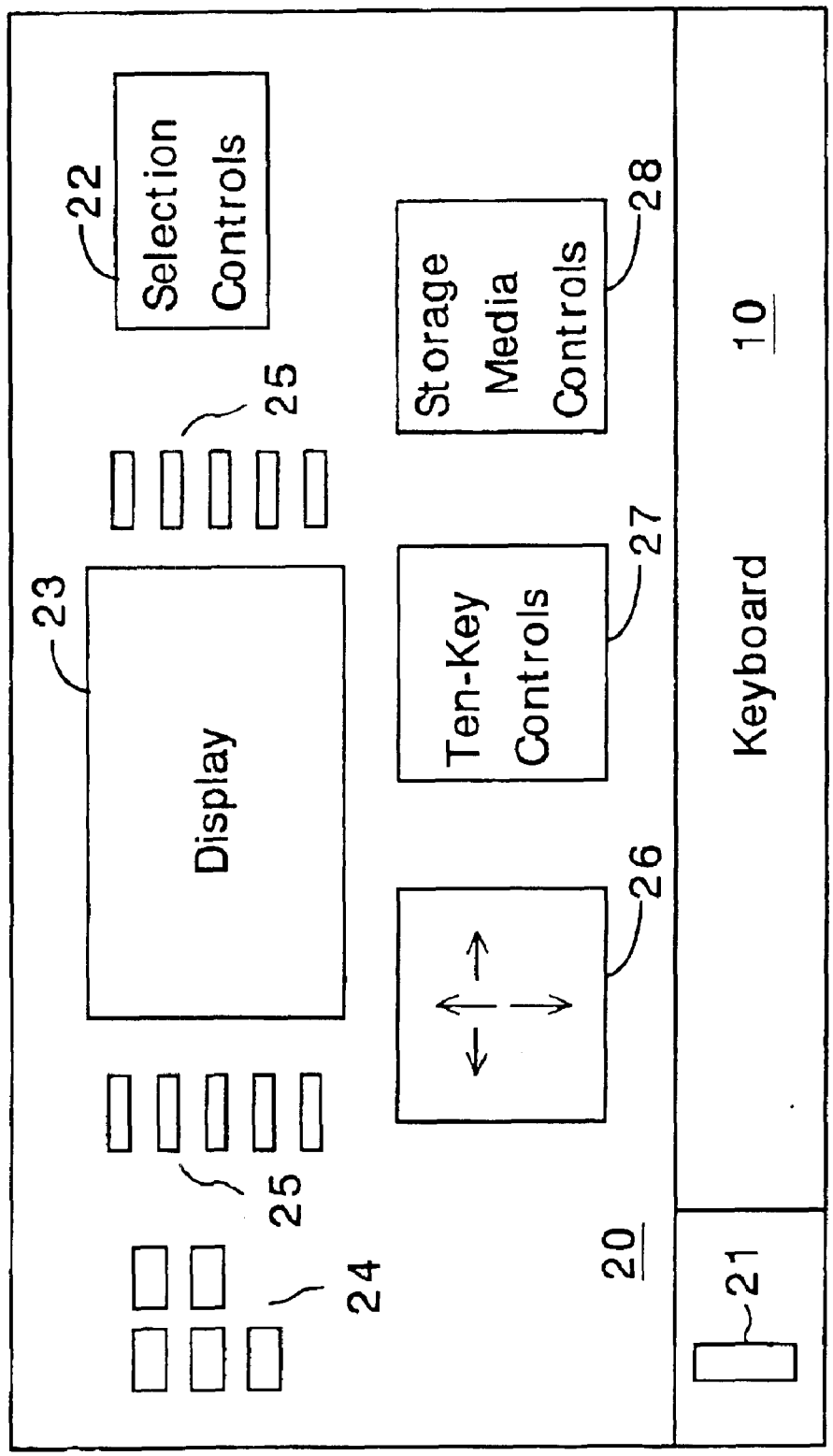
FIG. 1 is a plan view showing a configuration of an example of an electronic musical instrument embodying a data set selecting apparatus according to the present invention.
Figure 2:
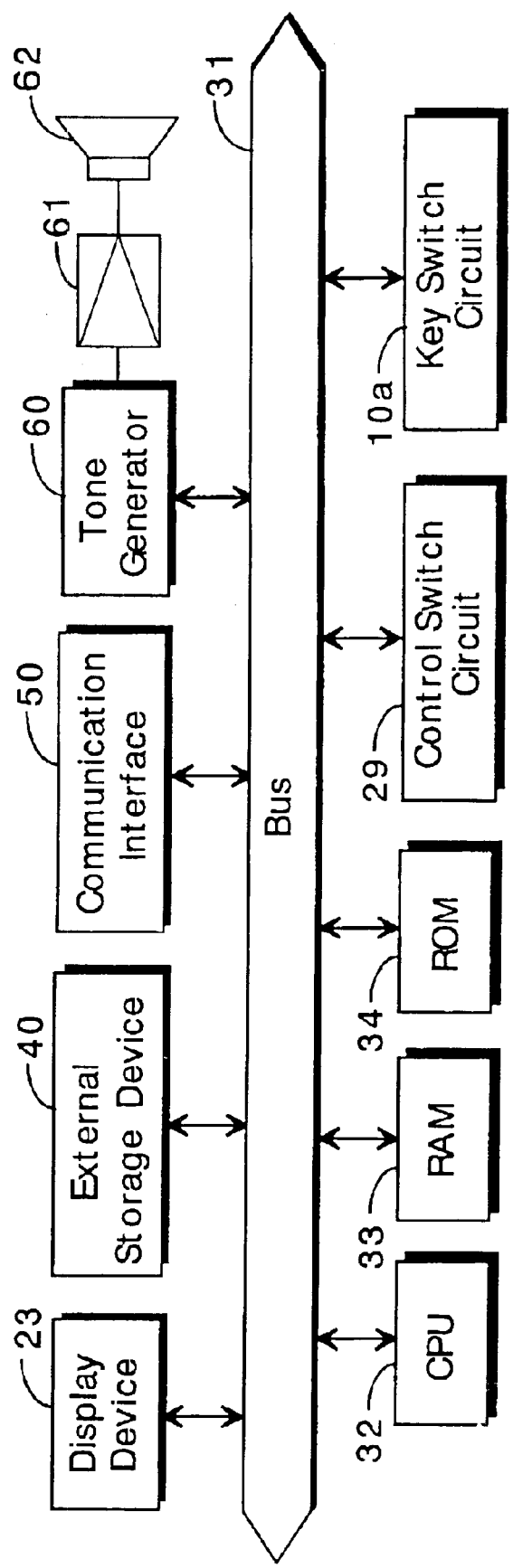
FIG. 2 is a block diagram of a circuital structure of the electronic musical instrument of FIG. 1.

FIG. 1 shows a general plan view of a configuration of an electronic musical instrument embodying an example of a data set selecting apparatus according to the present invention, and FIG. 2 shows a block diagram illustrating a general circuital structure of the electronic musical instrument of FIG. 1.

The electronic musical instrument includes a musical keyboard 10 and a control panel 20. The keyboard 10 includes a plurality of playing keys as control buttons for a musical performance, each designating a note pitch and commanding the generation of a tone signal having the designated note pitch. Depressions and releases of the keys are detected by key switches correspondingly provided to the respective keys in a key switch circuit 10a. The control panel 20 includes a wheel 21, as one of the performance controls, for controlling an effect (e.g. a pitch bend) to be added to the tone signals to be generated, a group of selection controls 22 for selecting tone properties such as tone colors of the tone to be generated and tone effects to be imparted to the tones, a display screen 23 structured, for example, an LCD for displaying characters, etc., a number (there are five in the Figure) of directory selecting controls (switches) 24 correspondingly allocated for the directories provided in the data stored in the storage medium, a number (there are ten in the Figure) of file selecting controls 25 arranged near and along the left and right sides of the display screen 23 in a vertical direction, cursor control keys 26 for moving the cursor left or right and up or down in the screen 23, a ten-key control group 27 including ten numeric keys and an enter key for inputting various data in association with the display on the screen 23, and a group of storage media controls 28 including a shift key, a delete key, a load key, a save key, an assign key, etc. for commanding data transfer to and from the storage medium. The actuations or operations of these controls 22, 24–28 are respectively detected by control switches provided in a control switch circuit 29 respectively corresponding to these controls.

The key switch circuit 10a, the display device 23 and the control switch circuit 29 are connected a bus 31, to which are further connected a CPU 32, a RAM 33 and a ROM 34 constituting a main portion of a microcomputer, and also an external storage device 40, a communication interface 50 and a tone generator 60.

The CPU 32 executes the program to detect actuation or operation on the keyboard 10 and the control panel 20, to control data read-out from the RAM 33, the ROM 34 and the storage medium in the external storage device 40 and data write-in to such RAM 33 and the storage medium, and to control the generation of musical tone signals. The RAM 33 and the ROM 34 are to store the programs and various data.

The external storage device 40 includes a storage medium or media such as compact disc CD, a flexible disk FD, a hard disk HDD, magneto-optical disk MO, a CD-ROM, a removable hard disk ZIP and a smart medium for storing various data and programs, and a drive device which reads out various data and programs from the equipped medium and/or writes in various data and programs to the medium. The communication interface 50 includes a MIDI (musical instrument digital interface) to enable interconnections with other external apparatuses such as a computer for receiving or transmitting performance data and other programs for controlling the generation of tone signals and the tone colors of the generated tones, and other necessary data.

The tone generator 60 forms and outputs musical tone signals according to the performance data supplied via the bus 31. The tone generator 60 contains a plurality of musical tone generating channels for generating various demanded tones. The type or fashion of tone generation may be variously employed from among a wave memory type, an FM synthesis type, a physical model type, a harmonics synthesis type, a formant synthesis type, an analog synthesizer type having VCOs, VCFs and VCAs, and any other types available in the art. The tone generator 60 is not necessarily limited to a hardware structure exclusively functioning as a tone generator, but may be a combination of a DSP (digital signal processor) and a microprogram or a combination of a CPU and a software thereby functioning as a tone generator. The plural tone generating channels may be formed by plural separate (individual) hardware circuits or by a small number of hardware circuit or circuits under a time division multiplexed use. The tone signals outputted from the tone generator 60 are supplied to an amplifier 61 and then to a speaker 62 to emit sounds in the air.

The operation of the above described embodiment will be as follows. The user of the electronic musical instrument turns on a power switch (not shown), actuates the selection controls 22 to select a tone color, an effect, etc., and starts a musical performance by manipulating the keyboard and/or the playing wheel 21. Then, the electronic musical instrument starts the musical performance operation. The CPU 32 executes the program, and detects the manipulations by the user (i.e. player) and delivers performance data determining tone colors and effects for the tones to be generated and performance data controlling generation (pitches, tunes, etc.) of the tones through the bus 31 to the tone generator 60. Upon receipt of such performance data, the tone generator 60 forms tone signals with the tone color, effect, etc. according to the received performance data along with the user's playing manipulation on the key board 10 and the wheel 21. The formed tone signals are emitted as audible sounds via the amplifier 61 and the speaker 62.

Next will be described about the operation in reading out data sets stored in a storage medium in the external storage device 40, deleting such data sets; and writing in data sets to a storage medium. The storage medium is divided into a plurality of directories (groups), each directory storing a plurality of files (data sets). Each file may contain tone color data and wave form data for the tones to be generated, effect control data to be imparted to the tones, automatic performance data, and so forth.

Figure 3:
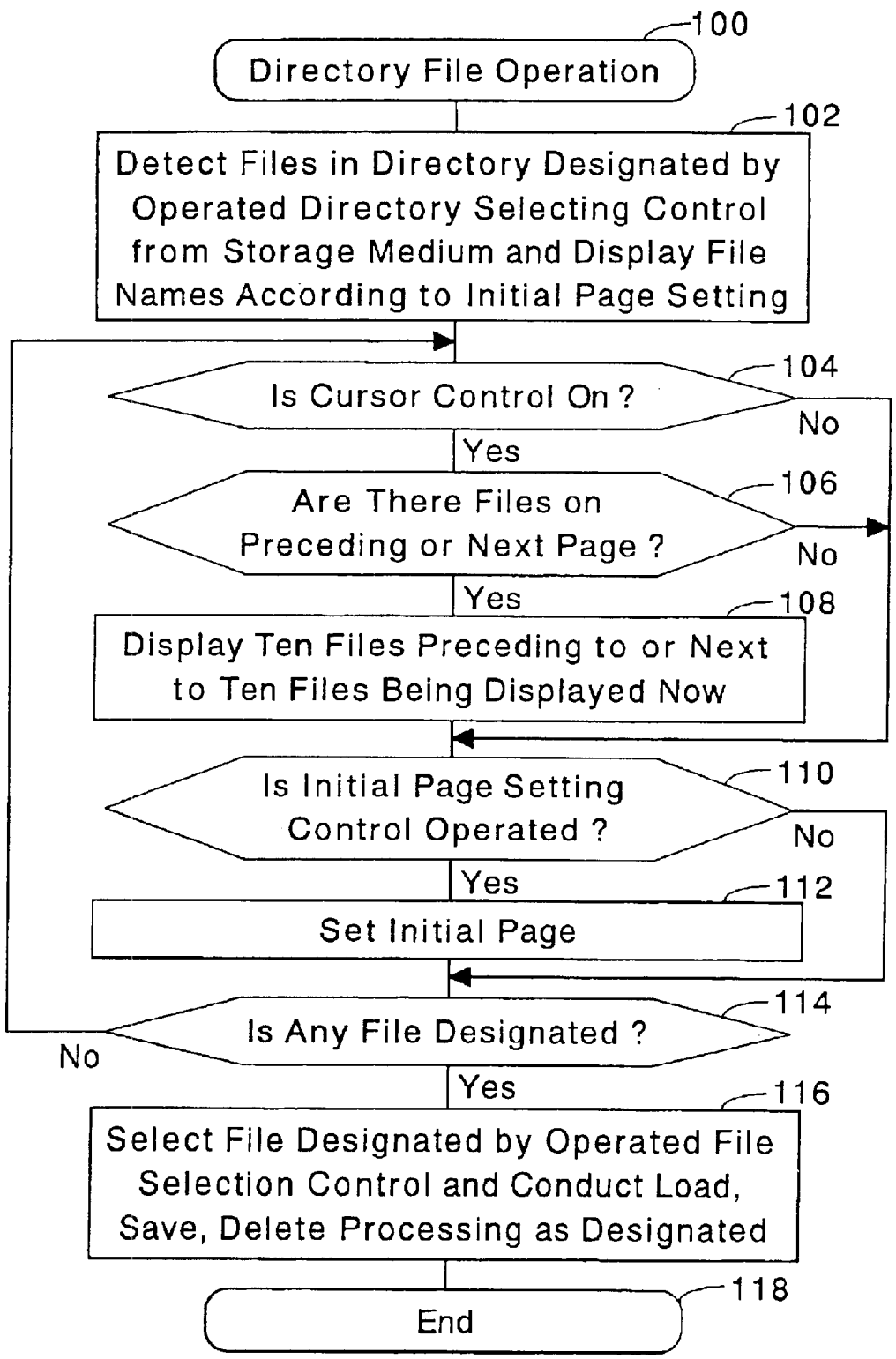
FIG. 3 is a flow chart describing a program of directory/file operation executed by the CPU in FIG. 2.
Figures 5, 6:
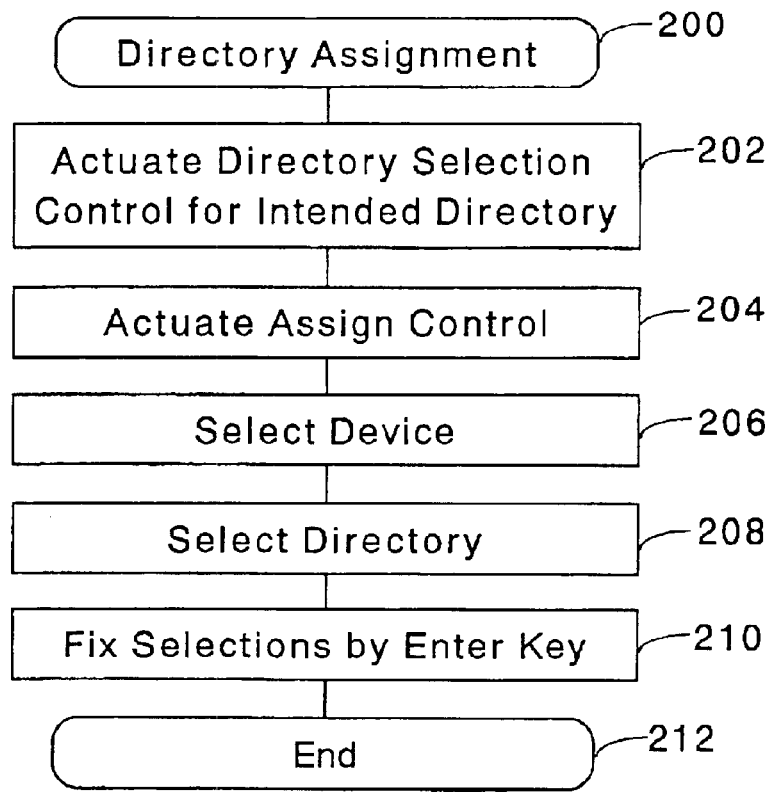
FIG. 5 is a flow chart describing a program of directory assignment executed by the CPU in FIG. 2.
FIG. 6 shows an image view of a display screen under directory assignment operation.

As the user manipulates a delete button, a load button, a save button or else in the storage media controls 28 to conduct a file deleting process, file reading process, file writing process, or else against the storage medium, the CPU 32 starts the execution of the directory/file operation program of the flow chart in FIG. 3, at a step 100. Upon start of the program execution, the CPU 32 waits for any manipulation of the five directory selecting controls 24, detects a plurality of files in the directory which corresponds to the manipulated directory selecting control 24 from the storage medium, and displays the file names (or other file identifiers) on the display screen 23 according to the initial page setting. If no directory or device is detected corresponding to the manipulated control (switch), a message to that effect will be displayed on the screen 23. Description hereinbelow will be made with respect to the case where the respective directory selecting controls 24 are allocated to the respective directories in the storage medium equipped in the external storage device 40 and the like. But in the case where the directory selecting controls 24 have not been allocated to the directories in the storage medium yet, a directory allocation process should take place before hand in connection with directory selecting controls 24 by executing a directory assignment (allocation) program as shown in FIG. 5 and as will be described hereinafter.

Figure 4A:
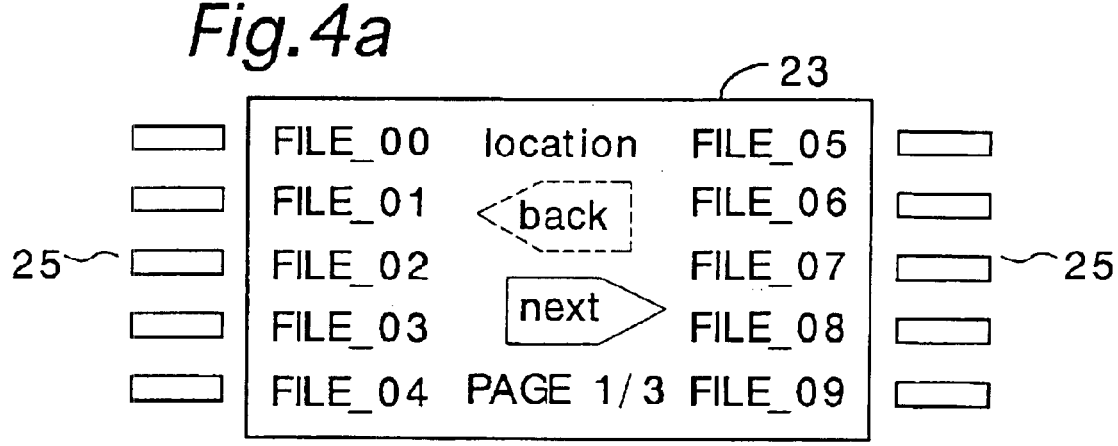
FIGS. 4a–4d show image views of a display screen under file selecting operation together with plan views of data set selecting controls arranged on a control panel.

The display status in the screen 23 will now be described more specifically. Suppose there are included, for example, twenty-six (26) files in the designated directory. Where the initial page setting is made to be page 1, the image view of the screen 23 will be as shown in FIG. 4a. Near the left side edge of the screen 23 are shown from top to bottom five file names from the first through fifth in page 1, i.e. from FILE_00 up to FILE_04, and near the right side edge of the screen 23 are shown from top to bottom further five file names from the sixth through tenth of page 1, i.e. from FILE_05 up to FILE_09. As apparent from the Figure, the respective ones of the ten file selecting controls 25 are correspondingly located in fire vicinity of the ten displayed file names. And in the center portion of the screen 23 are shown a preceding page mark "back" which means the preceding page is to be called by pressing the left move cursor key in the cursor key group 26 and a next page mark "next" which means the next page is to be called by pressing the right move cursor key in the cursor key group 26. In this shown case, however, the word "back" is surrounded by a broken line arrow meaning there is no preceding page, while the word "next" is surrounded by a solid line arrow meaning there is a next page thereto. At the bottom part of the center portion, the present page and the total page number are shown in a fractional number notation, namely "1/3" meaning there are three pages in total and the displayed page is the first of the three pages. Although the initial setting here is set at the first file in the alphanumeric order in the first page, the setting may be variously made by steps 110 and 112 as will be described hereinafter.

After the step 102, the CPU 32 continues processing through steps 104 to 114 repeatedly. During this repetition loop, the display status of the file names in the screen 23 will be altered in accordance with the manipulations of the left move cursor key and the right move cursor key among the cursor key group 26. The step 104 detects the actuation of either the left or the right cursor, key. The step 106 examines if there is a preceding page or a next page in the designated directory. The step 108 changes the display status of the file names in the screen 23 according to the manipulation of the left move or the right move cursor key in the cursor key group 26, by the display controlling processing to display in the screen 23 ten files preceding to the ten files now being displayed or other ten files next to the ten files now being displayed. For example, under the state in which the above described first to tenth files FILE_00 to FILE_09 are displayed, the actuation of the right move cursor key will cause both the steps 104 and 106 to judge affirmative (YES), and the step 108 displays in the screen 23 ten files in the next page (i.e. page 2), which are the eleventh to the twentieth file names FILE_10 to FILE_19 as shown FIG. 4b. In this status, there are pages both preceding to and next to the present displayed page, and therefore both the preceding page mark "back" and the next page mark "next" are surrounded by a solid line arrow. At the bottom part of the center portion is shown "2/3" meaning there are total of three pages and the displayed page is page 2.

Figure 4B:
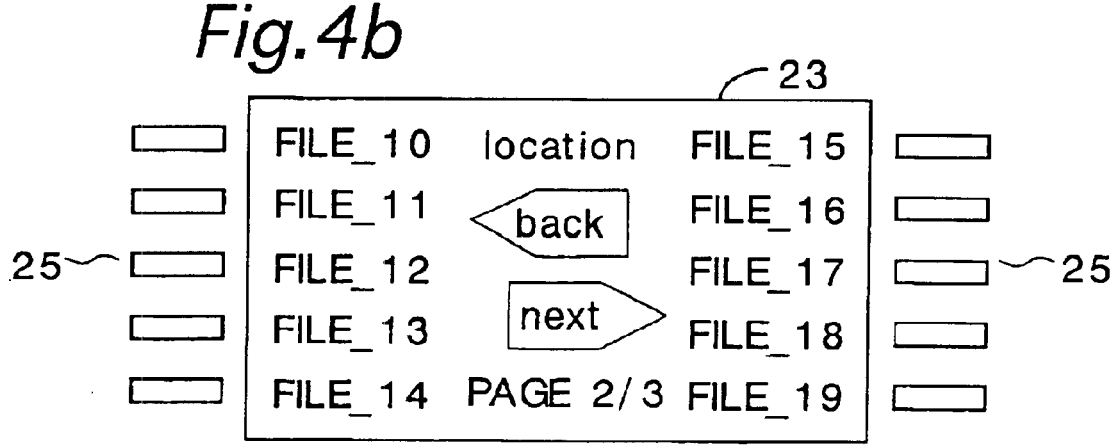
Figure 4C:
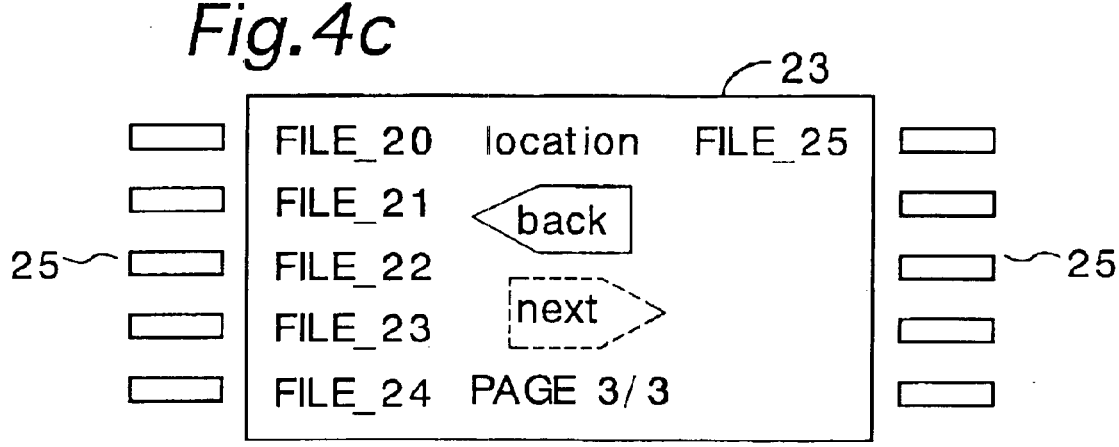

Further under this condition, if the right move cursor key in the cursor key group 26 is manipulated, the processing through the steps 104 to 108 displays in the screen 23 six file names FILE_20 to FILE_25 which are the twenty-first to twenty-sixth files in page 3 (there are no more files in this page in this instance) as shown in FIG. 4c. In this case, there exists a preceding page but no next page, and therefore the preceding page mark "back" in the center portion of the screen is surrounded by a solid line arrow, while the next page mark "next" is surrounded by a broken line arrow. At the bottom part of the center portion is exhibited an indication of "3/3" meaning there are three pages in all and the present page is page 3.

When the screen is exhibiting the state of FIG. 4c showing the files on page 3 and the left move cursor key in the cursor key group 26 is actuated, the processing through the steps 104 to 108 alters the displayed state of the screen 26 to the state of exhibiting page 2 as shown in FIG. 4b. Further when the screen is exhibiting the state of FIG. 4b showing the files on page 2 and the left move cursor key in the cursor key group 26 is actuated, the processing through the step 104 to 108 alters the displayed state of the screen 26 to the state of exhibiting page 1 showing the files on page 1 as shown in FIG. 4a.

During the repetition loop of processing the steps 104 through 114, if any one of the file selecting controls 25 is actuated, the step 114 judges affirmative (YES) and the process proceeds to a step 116. The step 116 is to designate a file which has a file name displayed at the position corresponding to the operated file selecting control 25 and to conduct a processing of deleting, loading or saving the designated file corresponding to the manipulation of a deleting control, a loading control or a saving control among the storage media selecting controls 28 before the execution of the directory/file selecting program. The file name at the position corresponding to the manipulated file selecting control 25 means the file name positioned at the right adjacent position to the manipulated file selecting control 25 among the five displayed file names displayed in the left area of the screen 23 in the case where any one in the left side file selecting controls 25 is manipulated. And in the case where any one in the right side file selecting controls 25 is actuated, it means the file name positioned at the left adjacent position to the actuated file selecting control 25 among the five displayed file names displayed in the right area of the screen 23. The execution of the directory/file operating program will be ended at a step 118 after the processing of the step 116.

Thus, as the selection of a desired file from among a plurality of files (data sets) provided in a plurality of directories (storage areas) of various storage media is conducted by selectively designating a directory by actuating a corresponding one of the directory selection controls 24 (storage area selecting controls) and by selectively designating a file in the thus designated directory by actuating a corresponding one of the file selecting controls 25 (data set selecting controls) which are arranged near the display screen 23 and in correspondence to the displayed file names, the user can designate an aimed file in an aimed directory by two direct operations of the assigned controls (switches). Thus a particular aimed file can be easily and rapidly designated from among a large number of files grouped in directories by simple operations.

An explanation will be now made about the initial page setting processing which is to change the initial page, i.e. the page carrying the file names exhibited in the screen at the first time after the manipulation of a directory selecting control 24 through the steps 110 and 112 during the process loop through the step 104 to the step 114. When a particular assigned operation for entering the initial page setting process, for example, a combined operation of the shift key and the save key among the storage media controls 28 is performed by the user, the step 110 judges affirmative (YES), i.e. that there is an initial page setting control, and the process moves forward to the step 112. The step 112 waits for an operation of designating a file name to be included in the initial set page from among the file names exhibited in the display screen 23. The filename designated by this designation operation is set in the directory to which the file of this file name belongs, to be initial page data. In this instance, the designation of the file name is performed by the concurrent operation of the intended one of the file selection controls 25 and a predetermined control (e.g. the save key in the storage media controls 28). The initial page data thus set is stored in the assigned directory in the RAM 33 and a storage medium in the external storage device 40, to be kept nonvolatile after the power switch of the electronic musical instrument is turned off.

Figure 4D:
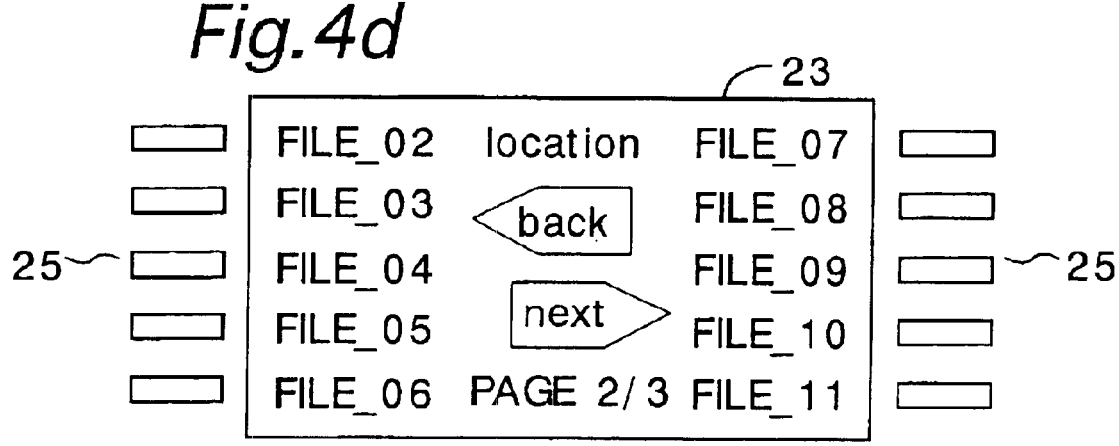

After the initial page setting is done, there will be exhibited ten file names in the screen 23 including at the top the file name represented by the initial page data followed by the next consecutive numbered nine files, and the preceding ten files and the succeeding ten files will be allotted to the preceding page and the next page, respectively. For example, under the state of the screen 23 like FIG. 4*a*, when the middle control key in the left five of the file selecting controls 25 is depressed concurrently with the predetermined key, the file name FILE_02 is set as the initial page data. Then, when the directory selecting control 24 which corresponds to the directory containing the set file name FILE_02 is actuated, the display screen 23 displays ten file names FILE_02 through FILE_11 from the third one to the twelfth one as shown in FIG. 4*d*. This facilitates the arbitrary alteration of the initial page contents for every individual directory, as a convenient function.

The next description will be about the operation of assigning the respective directory selecting controls 24 to the respective directories of various storage devices such as a compact disk CD, a flexible disk FD, a hard disk HDD, a magneto-optical disk MO, a CD-ROM, a removable hard disk ZIP and a smart medium.

The user first manipulates intended keys among the cursor keys 26, ten-key controls and storage media controls 28 to start up a directory assignment program. The execution of this director assignment program is started at a step 200 in FIG. 5. A step 202 waits for the actuation of a directory selecting control among the controls 24 for the directory of which the directory assignment (allocation) should be made. When such an operation occurs, the actuated directory control 24 is set as an assignment control key. A step 204 waits for the actuation of the assignment control key among the storage media controls 28. In response to the actuation, the step 204 detects all the external storage devices connected to the apparatus, and displays on the screen 23 various device names DEVICE of the various operative storage media such as a hard disk HDD, flexible disks FD1 and FD2, and so forth of the external storage device 40 on the left side column in the screen from up to bottom as shown in FIG. 6.

A step 206 then selects a storage medium, i.e. a device. For selecting an intended storage medium, the user moves the cursor on the screen 23 to the device name representing the intended one of the devices by operating the cursor keys 26 and presses the enter key, for example, in the ten-key control group 27 to determine the selection. This will place the selected device name at the left-up corner of the screen 23 as shown in FIG. 6, which exhibits the case where the hard disk HDD is selected as an example. Then, directory names representing the directories provided in the storage medium corresponding to the selected device name are listed in the center column of the screen 23 from up to down like, for example, ¥root, Song.MID, etc. The directory names attached with a "¥" mark (e.g. ¥root) means a directory under which are further provided sub-directories, while the directory names without the "¥" mark (e.g. Song.MID) means a directory under which is provided no sub-directory.

A step 208 is to select a directory in the above selected device. In this selection also, the user moves the cursor on the screen 23 to the directory name representing the intended one of the directories by operating the cursor keys 26 and presses, for example, the enter key in the ten-key control group 27 to determine the selection This will place the selected directory name at the middle-up area of the screen 23 as shown in FIG. 6, which exhibits the case where the root directory ¥root is selected as an example. Then, file names representing the files included in the directory corresponding to the selected directory name are listed in the right column of the screen 23 from up to down like, for example, AAA.MID, BBB.MID, ¥branch, etc. Also in this instance, the directory names attached with a "¥" mark (e.g. ¥branch) means a directory under which are further provided sub-directories, while the directory names without the "¥" mark (e.g. AAA.MID) means a directory under which is provided no sub-directory.

In the case where there are sub-files (e.g. in the case of ¥branch), this file may be treated as the above directory to further fist the sub-files included in the file. For example, the selected file name (e.g, ¥branch) is placed at the middle-up area of the screen 23 in place of the above selected directory name (¥root), and then sub-file names included in the selected file (e.g. ¥branch) will be exhibited in the upper empty area in the night column of the screen 23.

A step 210 waits for an operation of the enter key in the ten-key group 27, and upon detection, assign the directory in the device as selected by the steps 206 and 208 to the directory selection key in the group 24 as selected by the step 202 above. This assignment is kept non-volatile with the data representing the assignment being stored in the RAM 33 and any of the storage medium equipped in the external storage device 40, and reserved even after the power switch of the electronic musical instrument is turned off. After the process at the step 210, the execution of the directory assignment program comes to an end at the step 212. In order to assign another desired directory to another one of the directory selection controls 24, the directory assignment program will be initiated again to conduct operation in the similar manner as described above. Thus, the user can allocate desired directories provided in the various storage media to desired directory selection controls 24 on the electronic musical instrument according to the intended usage of the electronic musical instrument. Thus, the electronic musical instrument will become very user-friendly.

While in the above described embodiment, there are provided five directory selection controls 24 and ten file selection controls 25 to enable selection of an intended one from up to fifty files by actuating two designation controls, i.e. one directory selection control in the group 24 and one file selection control in the group 25. Of course, by differently providing the number of directory selection controls and the number of file selection controls, the available maximum numbers of directories and files can be arbitrarily designed. While in the above described arrangement, the file selection controls 25 are arranged along the left and the right side of the screen 23 (vertically aligned five to the left and other five to the right) and the file names are exhibited near the left and the right side in the screen 23 (five in left and five in right) correspondingly located at positions near to the respective file selection controls 25, the file selection controls 25 may alternatively positioned along the upper and the lower edges of the screen 23 (horizontally aligned five above and other five below) and the file names may be exhibited aligned horizontally near the top edge and the bottom edge, respectively, (five up and five down) correspondingly located at positions near to the respective file selection controls 25.

While in the above described embodiment, the assignment between the respective directories and the respective directory selection controls 24 is in the one-to-one correspondence relation, plural directory selection controls 24 may be assigned to a single (same) directory.

While particular embodiments of the invention have been described, it will, of course, be understood by those skilled in the art without departing from the spirit of the present invention so that the invention is not limited thereto, since modifications may be made by those skilled in the art, particularly in light of the foregoing teachings. It is therefore contemplated by the appended claims to cover any such modifications that incorporate those features of these improvements in the true spirit and scope of the invention.

What is claimed is:

1. A data set selecting apparatus connectable to an external storage device, wherein said storage device stores a plurality of data sets that are grouped into a plurality of data groups, comprising:
    a display screen;
    a plurality of data group selecting controls, each data group selecting control being allocated to each of said data groups;
    a plurality of data set selecting controls that are three-dimensional controls located separately in the vicinity of said display screen;
    an initial page setting device for designating, as an initial page data set, a desired data set from amongst the plurality of data sets that belong to a desired data group as selected by a user by means of a desired one of said plurality of data group selecting controls; and
    a display controller which causes said display screen to list a plurality of identifiers, each representing each of at least a part of said plurality of data sets belonging to a desired data group which is selected by the user by means of the data group selecting control that is allocated to said desired data group such that an order of identifiers to be listed on said screen is determined by said initial pave data set and that each of said listed plurality of identifiers is exhibited on said display screen at a location corresponding to and in the vicinity of each of said plurality of data set selecting controls that are thus allocated to said listed identifiers, wherein operating each of said plurality of data set selecting controls causes selection of the data set indicated by the identifier allocated to the operated data set selecting control.

2. A data set selecting apparatus as claimed in claim 1, further comprising a control panel, and wherein said display screen is provided on said control panel, and said data group selecting controls are arranged on said control panel.

3. A method for selecting data sets from among data sets stored in an external storage device storing a plurality of data sets that are grouped into a plurality of data groups, said method comprising:
    a step of individually allocating, to each of a plurality of data group selecting controls, one of said data groups;
    a step of selecting a data group including the data sets belonging thereto by using a plurality of data group selecting controls;
    a step of setting an initial nape data set by designating a desired data set from among the plurality of data sets that belong to the data group as selected by said step of selecting, a data group;
    a step of displaying, on a display screen, a list of identifiers, each representing each of said data sets included in said selected data group; and
    a step of selecting a data set from among the data sets correspondingly represented by said listed identifiers, by using a plurality of data set selecting controls, each of which is correspondingly allocated to one of said data set displayed wherein said plurality of data set selecting controls are three-dimensional controls located separately and outside of the display screen, each of which are correspondingly located near the allocated identifier listed, wherein an order of identifiers to be listed on said display screen is determined by said initial page data set and each of said listed plurality of identifiers is exhibited on said display screen at a location corresponding to and in the vicinity of each of said plurality of data set selecting controls which are thus allocated to said listed identifiers, and wherein the operating of the data set selecting controls cause a selection of the data set corresponding to the identifier that corresponds to the operated data set selecting control.

4. A storage medium for use in an apparatus for selecting data sets, said apparatus being of a data processing type comprising a processor, a display screen, a plurality of data group selecting controls, and a plurality of data set selecting controls, said apparatus being connectable to an external storage device storing a plurality of data sets that are grouped into a plurality of data groups, said plurality of data set selecting controls being three-dimensional controls located separately and outside of the display screen, each of which are correspondingly located near an allocated identifier displayed on said display screen, said medium containing a set of executable instructions for causing the processor to perform the steps of:
    individually allocating, to each of a plurality of data group selecting controls, one of said data groups;
    selecting a data group including data sets belonging thereto by using a plurality of data group selecting controls, each of which is correspondingly allocated to one of said plurality of data groups;
    for a selected data group, setting an initial page data set by designating a desired data set from amongst the plurality of data sets that belong to the data group as selected by said step of selecting a data group;

displaying, on said display screen, a list of identifiers, each identifier representing a corresponding one of data sets of a data group selected by the user; and selecting a data set from among the data sets correspondingly represented by said listed identifiers, wherein each of data set selecting: controls is correspondingly allocated for each of said data set individually, wherein the range and the order of the listed identifiers are determined by said initial page data set, and each of said listed plurality of identifiers is exhibited on said display screen at a location corresponding to and in the vicinity of each of said plurality of data set selecting controls that are thus allocated to said listed identifiers, and wherein operating each of said plurality of data set selecting controls causes selection of the data set indicated by the identifier allocated to the operated data set selecting control.

5. A data set selecting apparatus as claimed in claim 1, wherein said display controller causes said display screen to display the identifier with the identifiers representing said initial page data set being located at the top of the listed plurality of identifiers.

\* \* \* \* \*